United States Patent [19]

Berthier et al.

[11] Patent Number: 4,681,822

[45] Date of Patent: Jul. 21, 1987

[54] NOVEL COMPOSITES OF AN IONIC CONDUCTING POLYMER AND AN ELECTRONIC CONDUCTING POLYMER

[75] Inventors: Claude M. Berthier, Grenoble, France; Richard H. Friend, Cambridge, England

[73] Assignee: The British Petroleum Company, p.l.c., London, England

[21] Appl. No.: 752,047

[22] PCT Filed: Nov. 8, 1984

[86] PCT No.: PCT/GB84/00382

§ 371 Date: Sep. 9, 1985

§ 102(e) Date: Sep. 9, 1985

[87] PCT Pub. No.: WO85/02294

PCT Pub. Date: May 23, 1985

[30] Foreign Application Priority Data

Nov. 9, 1983 [GB] United Kingdom ............... 83 29906

[51] Int. Cl.$^4$ ............................................. H01M 6/18
[52] U.S. Cl. ..................................... 429/191; 429/192; 429/213
[58] Field of Search ....................... 429/191, 192, 213

[56] References Cited

U.S. PATENT DOCUMENTS

| 4,525,440 | 6/1985 | Barnette et al. | 429/191 |
| 9,556,614 | 12/1985 | Le Mehaute et al. | 429/191 |

FOREIGN PATENT DOCUMENTS

| 70958 | 2/1983 | European Pat. Off. . |
| 80329 | 6/1983 | European Pat. Off. . |
| 104726 | 4/1984 | European Pat. Off. . |
| 3139400 | 4/1983 | Fed. Rep. of Germany . |
| 2442514 | 6/1980 | France . |
| 78505 | 5/1983 | France . |

OTHER PUBLICATIONS

Chem. Abs., vol. 101; No. 114027y.

*Primary Examiner*—Brian E. Hearn
*Assistant Examiner*—Stephen J. Kalafut
*Attorney, Agent, or Firm*—Brook, Haidt, Haffner & Delahunty

[57] ABSTRACT

Novel composite conductors are provided comprising interpenetrating networks of a continuous electronic conducting material and a continuous ionic conducting material. Also provided is a method of producing films of the same.

8 Claims, No Drawings

NOVEL COMPOSITES OF AN IONIC CONDUCTING POLYMER AND AN ELECTRONIC CONDUCTING POLYMER

The present invention relates to novel composite materials and a method for preparing films of such composite materials. The composite materials herein are useful in electrical applications such as electrodes in solid state energy storage devices.

It is known to produce energy storage devices which use an electrode of a conducting polymer and an electrolyte which may be either a solid or a liquid. Solid-state energy storage devices have been prepared having a composite or laminar structure comprising a layer of electrolyte being sandwiched, either as such or impregnated in a matrix, between two electrodes. It is also known that by electrochemically doping the conducting polymers with a dopant anion or cation, the polymers of this type can be used to store electric charge.

In such solid-state devices, the conducting polymer acts as the electronic conductor and the electrolyte matrix as the ionic conductor. One of the major drawbacks of using composites in such devices is that the migration of ions from the electrolyte to the polymer electrode is hindered by the relatively low diffusion rate of the dopant ion into the polymer electrode, and the resulting high internal resistance reduces the devices performance.

It has now been found that the ion diffusion rate characteristically found in conventional conductive composite materials can be significantly increased by preparing a ionic/electronic composite conductor comprising interpenetrating networks of a continuous electronic conducting material and a continuous ionic conducting material. Such composite conductors can be used in a variety of electrical applications but are particularly suited for use in solid state energy storage devices.

Accordingly, the present invention provides an ionic/electronic composite conductor comprising interpenetrating networks of a continuous electronic conducting material and a continuous ionic conducting material.

In a preferred embodiment, the composite conductor is a coherent film.

The present invention also provides a method for preparing a film of a composite conductor comprising interpenetrating networks of a continuous electronic conducting material and a continuous ionic conducting material, the method comprising
(i) preparing in a common sovlent or solvent mixture a solution of an ionic conducting material and an electronic conducting material or a precursor thereof,
(ii) intimately mixing the solution, and
(iii) casting the solution on a substrate, and
(iv) removing the solvent.

According to another embodiment of this invention, an energy storage device is provided containing at least one electrode comprising interpenetrating networks of a continuous electronic conducting material and a continuous ionic conducting material.

By "interpenetrating networks" is meant herein that each material of the composite conductor is continuous and intimately mixed with the other material throughout the composite. In order to determine that the materials are intimate and continuous, thermal analysis can be conducted in accordance with known differential thermal analysis (DTA) techniques. Such techniques will show an increased melting point for the ionic conducting material, as compared to its normal melting point, when the electronic conducting material and the ionic conducting material are interpenetrating.

The electronic conducting material of the ionic/electronic composite conductor according to the present invention is formed from a conducting hydrocarbon polymer which is soluble in the solvent employed. For example, these materials include but are not limited to soluble precursor polymers of polyacetylene and polyphenylene which can be subsequently converted to polyacetylene and polyphenylene; soluble electronic conducting polymers such as polyphenylene diphenyl vinylene; or soluble substituted electronic conducting polymers such as phenyl substituted polyacetylene. Polyacetylene precursors are preferred.

The ionic conducting material of the composite conductor is a mixture or a complex of an ionic salt, containing anions such as $AsF_6-$, $PF_6-$, $BF_4-$, or $ClO_4-$, and cations such as alkali metal cations, e.g. $Li+$, with a polymeric solvating agent capable of solvating the ionic salt such as a polyalkylene oxide. Preferred polyalkylene oxides are polyethylene oxide and polypropylene oxide.

The ionic conducting material comprising the mixture or complex of the ionic salt and the polymeric solvating agent may be formed by doping the polymeric solvating agent with an appropriate ionic salt before, during or after the production of the composite conductor. Any of the well known doping techniques for incorporating anions or cation into polymer materials can be used.

The ionic/electronic composite conductor of the present invention is prepared by intimately mixing the electronic conducting material with the ionic conducting material. The electronic conducting material and the ionic conducting material are dissolved in a common solvent or solvent mixture. The solvent or solvent mixture must be capable of solubilising both materials in sufficient concentrations and must not substantially react with either material. The solvents used herein are polar organic solvents or mixture thereof. Preferred is tetrahydrofuran. The solution of the electronic conducting material and the ionic conducting material should be throughly mixed.

A film of the composite can be cast from solution by pouring the solution onto a substrate and removing the solvent by heating at elevated temperatures from 20° to 150° C., typically about 50° C., or by spinning the substrate at high rates of revolution. The solvent should be removed quickly, preferably by evaporation, so that phase separation of the component materials is inhibited.

In a variation of the above process, the ionic salt may be added to a solution of the electronic conducting material and a polymeric solvating agent prior to casting the film.

The relative molar concentrations (in terms of the polymerised units in the respective monomers) of the electronic conducting material and the polymeric solvating agent in the composite is suitably from 1:10 to 10:1, preferably from 1:2 to 2:1 and most preferably 1:1.

The molar concentration of the dopant ionic salt in the polymeric solvating agent is preferably from 2:1 to 5:1 based on moles of salt per mole of total polymerised units in the polymer.

In a preferred embodiment of this invention, the electronic conducting material is a poly(acetylene) precursor polymer of 7,8-bis(trifluoromethyl) tricyclo-[4,2,2,0$^{2,5}$]-deca-3,7,9-triene which is described in European Patent publication No. 0080329. The ionic/electronic conductor containing the precursor polymer is prepared as discussed above. The resultant product is then cast into a film and then converted by heat treatment into a film of a composite comprising interpenetrating networks of a continuous electronic conducting polyacetylene and a continuous ionic conducting material. The composite film is subsequently steeped in a solution of an ionic salt to form the ionic/electronic composite conductor.

The precursor polymer is converted to polyacetylene by heating the polymer at a temperatures below 130° C., preferably 70° to 120° C., under vacuum or in the presence at an inert atmosphere. The specific temperature and duration of heating will depend on the rate of transformation desired. Typically, the heating is conducted for a period from 1 to about 100 hours, preferably between 10 and 50 hours.

The polyacetylene prepared from the precursor polymer can be doped after casting by known chemical or electrochemical techniques. Suitable dopants are well known to those skilled in the art.

The energy storage device of this invention comprises at least one ionic/electronic conductor employed as an electrode and a solid electrolyte. The preferred embodiment comprises two ionic/electronic conductors with a solid electrolyte therebetween. The solid electrolyte should be ionically conducting but not electronically conducting such as a polyalkylene oxide.

In a more preferred embodiment, polyalkylene oxide (PAO), preferably polyethylene oxide, is sandwiched between two layers of a polyacetylene/PAO composite conductor film prepared according to the present invention and incorporating a suitable ionic salt. The PAO solid electrolyte also incorporates an ionic salt. The structure can be built up by successive evaporations from a solution of polyacetylene precursor, PAO and ionic salt on the one hand and a solution of PAO and ionic salt only on the other hand, combined with a heating step to convert the precursor polymer into an electronically conducting polyacetylene polymer, (CH)$_x$.

As constructed, the cell is in a discharged state. It is charged by passing current through it, in either direction. The (CH)$_x$ initially has relatively low conductivity, but ionic conduction allows reasonable charging rates until the electronic conduction becomes high. At the anode, anions are removed from the PAO matrix and dope the (CH)$_x$ so that the anode (CH)$_x$ becomes p-type. Similarly, at the cathode, cations are removed from the PAO matrix, and dope the (CH)$_x$ electrode to become n-type. Charging is complete when a suitable doping level in the (CH)$_x$ is achieved (for instance 20% per (CH) unit). Discharge of the cell reverses the composite conductor with a large area for large electrical contact pads, to reduce the internal impedance of the cell. Specific examples of contact pads include those made from gold, platinum and silver although any metal capable of giving ohmic contact with the electronic conducting polymer may be used.

Since the cell is in the form of a flexible film (before charging) it can be, for example, conveniently rolled up into a cylindrical shape. The combination of the thin cell and the large surface area readily gives very low internal impedances, and makes possible the construction of cells with relatively high power densities.

The present invention is illustrated by the following examples. However, the scope of this invention should not be limited to the examples but includes modifications, variations and equivalent embodiments that fall within the scope of the attached claims.

EXAMPLE 1

Preparation of CH$_x$/PEO Composites

Two equivalent molar concentration solutions were prepared containing approximately 5.0×10$^6$ molecular weight polyethylene oxide and poly(acetylene) precursor polymer of 7,8-bis(triflurormethyl) trichloro-[4,2,2,0$^{2,5}$]-deca-3,7,9-triene each tetrahydrofuran. The two solutions were then mixed using a magnetic stirrer to ensure thorough mixing. The resulting mixture was cast onto a prepared and heated substrate at about 60° C. in a inert atmosphere. Once the solvent had evaporated, the film was then evacuated under reduced pressure to remove any remaining solvent and then heated to about 80° C. for 11 hours to transform the precursor polymer to poly(acetylene).

Conductivity measurements were taken of the above film using a Keithley 220 current source, Keithley 619 DMM/electrometer in a Van der Pauw configuration which gave a conductivity of about $10^{-6}$ ohms$^{-1}$ cm$^{-1}$.

The film was then doped by contacting it with gaseous iodine for about 60 minutes. The conductivity was again measured and found to be about $10^{-3}$ ohms$^{-1}$cm$^{-1}$.

EXAMPLE 2

A film of the poly(acetylene) precursor/polyethylene oxide was prepared as above and differential scanning calorimetry measurements were preformed using a Perkin-Elmer DSC-2C. The thermagram showed the characteristic melting point of polyethylene oxide and a characteristic dual exotherms of the precursor polymer. However, the melting point of the polyethylene oxide was observed to have increased by about 20° C. in a sample containing a 1:1 molar ratio of polyethylene oxide and precursor in the film.

Hot stage microscopy of the same film was preformed to observe the morphology of the film during evaporation and transformation. In a sample containing a 1:1 molar ratio of polyethylene oxide/poly(acetylene) presursor, it was observed that no separation occurred between the two materials when a film was casted at 60° C. and the precursor was transformed to poly(acetylene) at 80° C.

We claim:

1. An ionic/electronic composite conductor comprising a continuous, coherent electronic conducting material selected from the group consisting of polyacetylene, polyphenylene, polyphenyl diphenyl vinylene and a substituted polyacetylene intimately mixed with a continuous ionic conducting material which is a mixture of a complex of an ionic salt and a polymeric solvating agent, such that the ionic conducting material has an increased melting point over its normal melting point.

2. The conductor of claim 1 wherein the conductor is a coherent film.

3. The conductor of claim 1 wherein the polymeric solvating agent is a polyalkylene oxide.

4. The conductor of claim 3 wherein the electronic conducting material is polyacetylene prepared by heating a polymer of 7,8-bis-(trifluoromethyl) tricyclo-[4,2,3,0$^{2.5}$]-deca-3,7,9-triene.

5. An energy storage cell comprising two electrodes, at least one of which is an ionic/electronic conductor as defined in claim 1, and a solid electrolyte therebetween, the solid electrolyte being an ionic conductor but not an electronic conductor.

6. The energy storage cell of claim 5 wherein the two electrodes are each an ionic/electronic conductor as defined in claim 1.

7. The energy storage cell of claim 6 wherein the ionic conductor is a polyalkylene oxide containing an ionic salt, the electronic conducting material is polyacetylene or polyphenylene and the solid electrolyte is a polyalkylene oxide containing an ionic salt.

8. The conductor of claim 1, wherein the electronic conducting material is a conducting hydrocarbon polymer.

* * * * *

UNITED STATES PATENT AND TRADEMARK OFFICE
CERTIFICATE OF CORRECTION

PATENT NO. : 4,681,822
DATED : July 21, 1987
INVENTOR(S) : Claude Marc Berthier et al It is certified that error appears in the above-identified patent and that said Letters Patent is hereby corrected as shown below:

In the title, "Novel Composites Of An Ionic Conducting Polymer And An Electronic Conducting Polymer" should read -- Novel Composites --.

Col. 4, line 16, "each" should read -- each in --.

Signed and Sealed this

Nineteenth Day of January, 1988

Attest:

DONALD J. QUIGG

*Attesting Officer*     *Commissioner of Patents and Trademarks*